UNITED STATES PATENT OFFICE.

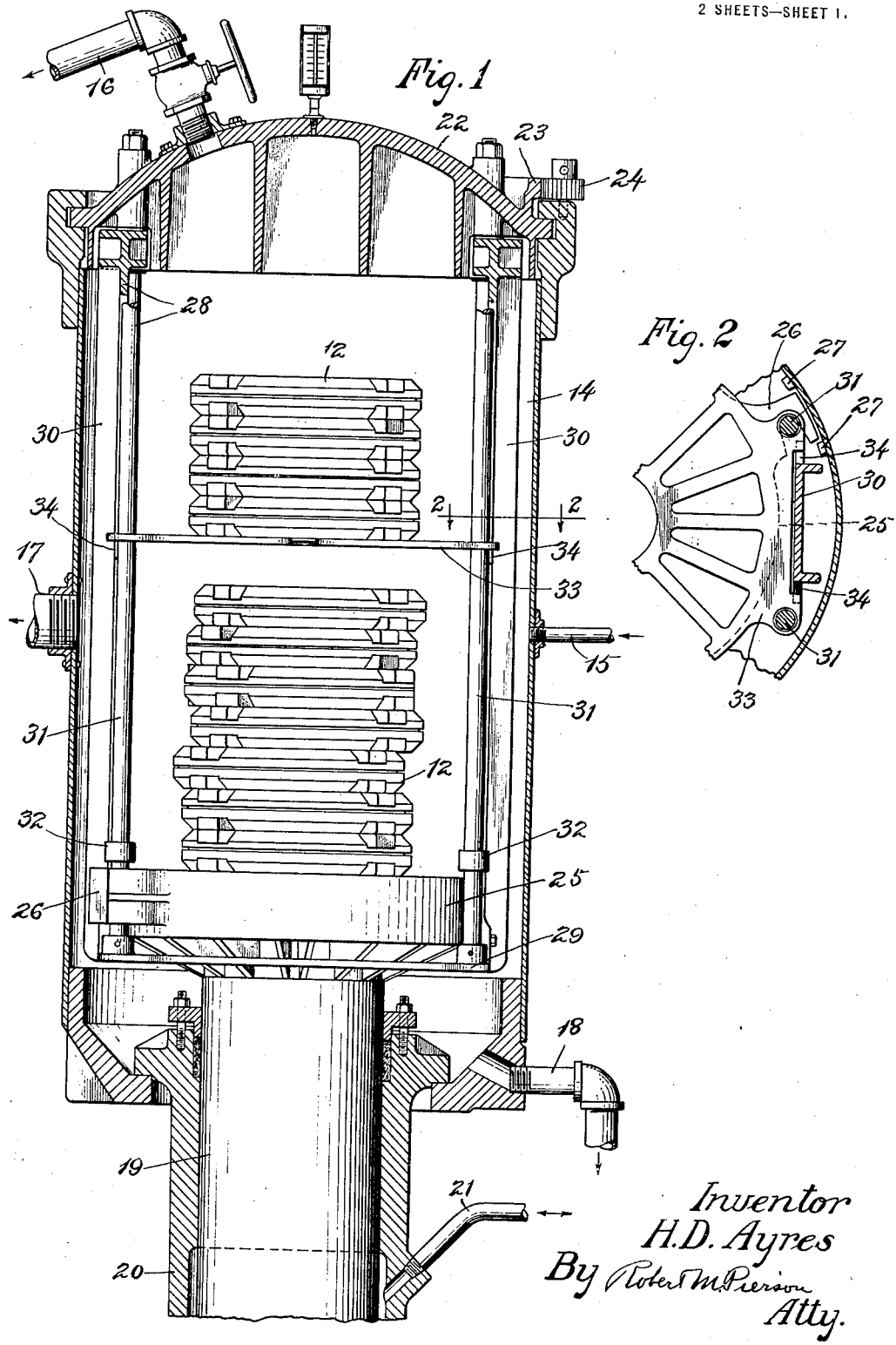

HIRAM D. AYRES, OF AKRON, OHIO, ASSIGNOR TO THE B. F. GOODRICH COMPANY, OF NEW YORK, N. Y., A CORPORATION OF NEW YORK.

METHOD OF VULCANIZING RUBBER ARTICLES.

1,408,678.     Specification of Letters Patent.     Patented Mar. 7, 1922.

Application filed March 27, 1919, Serial No. 285,434. Renewed July 27, 1921. Serial No. 488,005.

*To all whom it may concern:*

Be it known that I, HIRAM D. AYRES, a citizen of the United States, residing at Akron, in the county of Summit and State of Ohio, have invented a certain new and useful Method of Vulcanizing Rubber Articles, of which the following is a specification.

This invention relates to the art of vulcanizing rubber articles in molds, especially those articles containing one or more layers of fabric, such as pneumatic tire casings. A specific object I have had in view is to enable a raw tire with the rubber tread thereon to be completely cured on a rigid core between rigid outer mold members, without any substantial displacement of fabric by the drag of the rubber as the latter flows to fill out the mold. A more general object is to enable the vulcanization of a tire or any rubber article which may advantageously be subjected to this process to be performed by heating the mold containing the article in open steam without fully closing said mold or fully sealing it against the entrance of fluid during the initial stage of heating, and with an avoidance of objectionable effects due to the collection of water of condensation in the mold.

Of the accompanying drawings,

Fig. 1 is a vertical section showing an open-steam tire vulcanizing press of a type adapted for the practice of my invention and containing a series of superimposed molds.

Fig. 2 is a horizontal section on the line 2—2 of Fig. 1.

Figure 3:
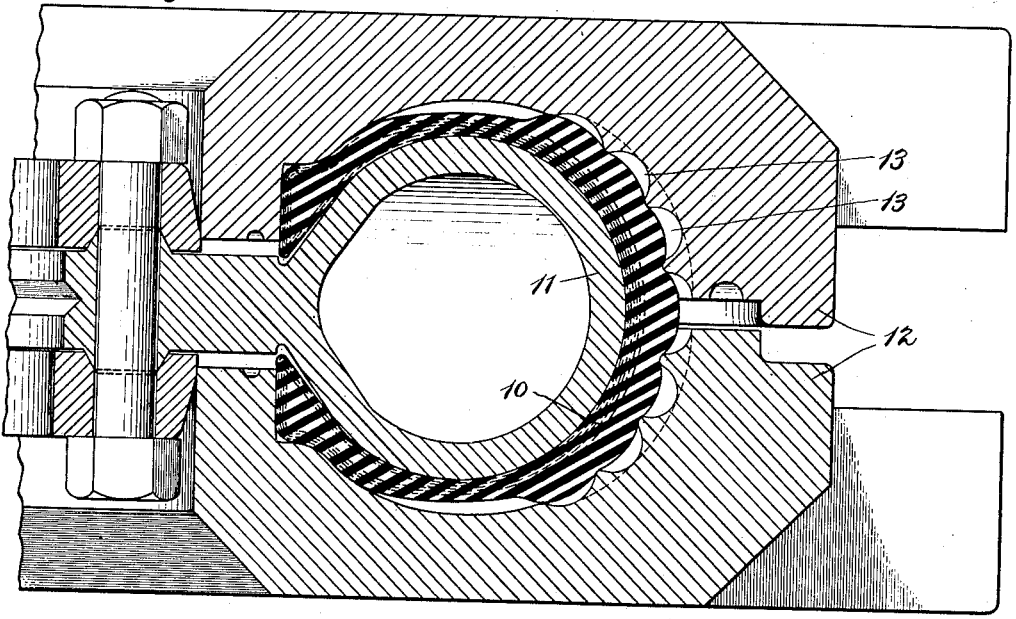
Fig. 3 is a section of a mold and tire on a larger scale, showing approximately the relation of the parts during the first stage of heating.
Figure 4:
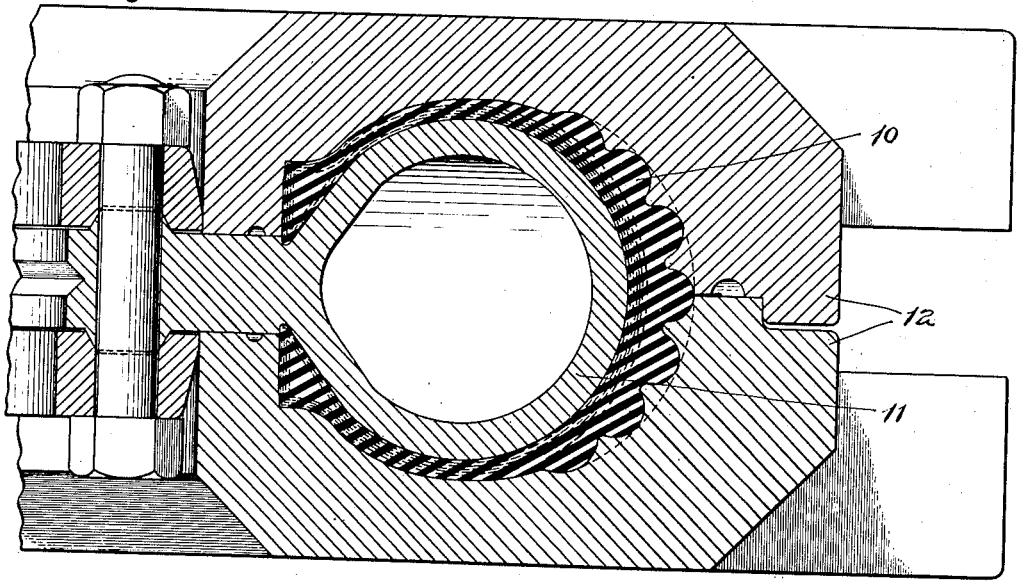
Fig. 4 is a similar view showing the parts of the mold fully closed together.

The steps of the method involved in the preferred mode of practicing my invention upon a tire casing consist, briefly stated, in building the casing complete, including carcass, beads, side and tread rubber in substantially its ultimate U-shape upon the usual annular core, placing said tire and core between the halves of the outer mold and placing said mold with the tire and core therein on the platen of the press within the vulcanizing chamber, closing the vulcanizer and admitting steam thereto without fully closing the mold, causing the steam to act upon the tire at a pressure and temperature and for a length of time sufficient to soften the thread rubber (and if desired to partially cure the carcass rubber,) reducing the pressure of the steam to or toward that of the atmosphere so that the heat contained in the tire and mold and in the water of condensation collecting in the mold will, at the lower pressure, re-evaporate said water of condensation and dry the interior of the mold, and then fully closing the mold by mechanical pressure and completing the cure by admitting steam to the vulcanizer at a temperature and pressure and maintaining it for a length of time sufficient fully to vulcanize the rubber in the tire.

While any suitable form of apparatus may be employed for practicing the invention, I have shown in the drawings a vulcanizing press of a well-known type together with cores and molds of the usual form for curing pneumatic tire casings by the unit-cure mold method, and it is one of the advantages of my invention that it may be practiced entirely with the ordinary existing apparatus of a factory equipped for that method without requiring any additional apparatus, and furthermore without requiring any extra handling of the molds or tires, the added operations involved in the present invention as compared with the full-molding single-cure method being performed by mere manipulation of the vulcanizing press and the steam supply.

10 indicates a tire casing which may be built up on the annular iron core 11 in any of the usual ways, with a carcass formed of rubberized layers of square-woven fabric or individually-laid cords, or cord or thread fabric, together with suitable beads and the usual side and tread rubber. 12 is the outer mold composed of the usual upper and lower halves and formed in this case with pockets or cavities 13 for the embossing of anti-slipping projections upon the surface of the tread, and there may also be other cavities (not shown) for molding any desired lettering and other marks on the sides.

14 is the chamber of a vertical pot vulcanizer having a steam inlet 15, steam outlets 16 and 17, and a drip outlet 18, and 19 is the hydraulic piston, ram or plunger working in a cylinder 20 at the lower end of the vulcanizer and having a pipe 21 for the admission and discharge of water. 22 is the cover of the vulcanizer adapted to be interlocked with the fixed rim of the chamber 14 by a suitable locking device of the breech-block type and having a gear-segment 23 formed on its periphery engaging with a stationarily-mounted gear pinion 24, the rotation of which turns the cover 22 sufficiently to bring it to its locking and unlocking positions. The lower side of the cover 22 constitutes the top platen of the press whose movable platen 25 is carried on the upper end of the ram 19, the tire molds 12 being stacked above the lower platen and subjected to a heavy closing pressure when the stack is moved upwardly against the stationary cover 22 by the elevation of the ram. In the type of apparatus here shown, provision is also made for using the ram to raise and lower the cover and for dividing the total stack of molds into two smaller stacks or sections located one above the other. For this purpose the movable platen 25 is formed with hooked lugs 26 and is prevented from rotating by means of fixed vertical guides 27, a pair of which are shown in Fig. 2. A frame 28, composed of an annular lower plate 29, vertical side bars or plates 30, and vertical rods 31, is suspended from the cover 22 and adapted to turn therewith. The rods 31 are provided with bosses 32 near their lower ends, and when the frame and cover are turned counter-clockwise, as viewed in Fig. 1, in a direction to unlock the cover, two of the rods 31 are carried into the recesses of the lugs on the platen and their bosses 32 are brought into line with said lugs so that when the platen 25 is elevated by the ram it will carry with it the frame and cover, thereby opening the vulcanizer and enabling the molds to be slid off laterally one by one onto a suitable platform placed above the level of the vulcanizer mouth as the ram is stepped to successive levels, the loading of fresh molds being performed in a reverse manner. The upper section of molds is supported halfway on a plate 33 whose edges are apertured to receive and slide upon the rods 31 and adapted to be sustained on shoulders 34 on the vertical frame plates 30 when the platen 25 is at the lower end of the frame 28. When the cover is turned into its locking position the bosses 32 are carried out of register with the hooked lugs 26 on the lower platen, and when the ram is elevated said platen carries with it the molds 12 while the locked cover 22 remains stationary. The lower section or stack of molds picks up the plate 33 and the upper stack or section, and the upper end of the combined stack abuts against the cover so that the molds will be tightly squeezed between the two platens when sufficient hydraulic pressure is employed. The amount of pressure used in the final stage is that which will close the molds and cause the surface rubber to fill out its cavities when the rubber has become sufficiently plastic to flow readily. The minimum pressure required depends upon the area of the ram and the resistance encountered. 450 pounds per square inch has been used on a ram 26 inches in diameter, but a less pressure would probably suffice.

After the raw casing has been formed complete upon the core or mandrel 11, the tire and core are placed between the halves of the mold 12 and a series of said molds with their contained tires and cores are stacked in the vulcanizing press as indicated in Fig. 1, whereupon the cover 22 of the vulcanizer is closed, the steam and drip outlets are shut off and steam is admitted and maintained at about 40 pounds pressure, corresponding to a temperature of 287° F., for a sufficient length of time to soften the tread rubber and preferably partially to set or cure the carcass rubber. The time required for this part of the operation is about 20 to 25 minutes, depending somewhat upon the size of the tire and also upon the mode of compounding the rubber stocks. I prefer to compound the rubber stocks in such a manner that the tread rubber will soften but will not set or cure to an appreciable extent during this first stage of heating, while the carcass rubber will have a relatively shorter period of softness and will begin to set or cure during the first stage, and its complete curing will require a longer time than the curing of the tread rubber. The softness here referred to is of course relative, for while the cured rubber in a pneumatic tire is known as soft rubber, it is also well known that vulcanizable raw rubber compounds, when heated, pass through a condition of greater fluidity or plasticity than they possess in either their raw or their finally-cured state. The press platen remains down during this first stage so that the closing pressure exerted on the molds is only that of the upper half of the mold plus the weight of any superimposed molds in the stack, although I sometimes elevate the ram and squeeze the molds momentarily while the tires are cold in order to compress the beads and bring the mold parts closer against the tire, and then depress the ram and relieve the heavy pressure before admitting the steam. The momentary pressure employed for this purpose may be the full hydraulic pressure, and the molds may thereby be almost fully closed, but as the cold rubber is comparatively stiff and resilient the tire resumes nearly its original condition when the hydraulic pressure is removed and no permanent harmful displacement of fabric ensues. The relation of tire and mold during the first heating stage is substantially as indicated in Fig. 3.

The presence of the mold in contact with the tire at many points and in close proximity at other points during the first heating stage is beneficial in several ways, as affecting both the quality of the product and the time required for the vulcanizing operation. First, it tends to prevent any substantial amount of blowing or blistering of the rubber in the tire after the steam pressure is removed at the end of said stage, a phenomenon which is often observed when it is attempted to cure an unconfined body of rubber having considerable thickness, especially when the heating is rapidly performed in open steam at super-atmospheric pressure with the accompanying relatively-high temperature. The simple expedient here adopted to avoid this difficulty dispenses with the necessity of resorting to such methods as wrapping in cloth, cooling the tire in compressed air, or warming or heating the tire in a separate preliminary stage before applying a quick-vulcanizing temperature. Secondly, the presence of the partly-open mold engaging the tire with considerable pressure during the first stage of heating initiates and may even nearly complete the embossing of the tread and sides to the configuration of the mold, sufficient time being allowed for the rubber to flow gradually without dragging the fabric with it; and thirdly, it provides a mold, core and tire which have become thoroughly heated, and are assembled in the proper relation, for quickly completing the molding and vulcanizing operation under full pressure in the second stage. The section of a tire removed from the mold for the purpose of observation at the end of the first stage of my process shows the tread projections well defined, and exhibits a degree of fine porosity caused by small gas or air bubbles in the surface rubber, but no blistering or large pores of any consequence. The pores entirely disappear during the second stage of curing under hydraulic ram pressure.

At the end of the first stage of heating the mold must be rid of the water of condensation which has accumulated between it and the tire, especially in the lower half of the mold, since otherwise the product will be blemished by water-marking due to the presence of entrapped water during the final stage of heating. I have discovered that this drying operation can be effected in a very simple manner by merely reducing the pressure of the steam to a point below the vapor pressure of water at the temperature of the mold and tire. The heat contained in the mold, tire and water of condensation re-evaporates the water or moisture present and leaves the mold and tire substantially dry. This step is most conveniently performed by simply blowing the steam off into the atmosphere or into a low-pressure main, and is preferably followed by opening the vulcanizer for a brief period and lifting the stack up into the atmosphere by elevating the ram so that nearly all of the vapor will pass away.

The ram is then again lowered while the tire, core and mold are still hot, the vulcanizer is closed, full hydraulic pressure is brought to bear upon the mold so as completely to close the same, and steam is admitted to the chamber 14 and maintained at a suitable pressure and temperature for a time sufficient to complete the vulcanization of the tire. This will depend somewhat upon the size of the tire and the mode of compounding, and may, for example, be a pressure of 50 pounds corresponding to a temperature of 297° F., maintained for a period of 30 to 45 minutes. The plasticity and partial molding of the surface rubber produced during the first stage of heating leave very little further molding to be performed during the second stage when the tire is compressed tightly between the mold and core, although the molding is of course carried to completion and the elements of the tire fully consolidated, but this second stage is devoted largely to effecting the vulcanization of the tread and sides and completing that of the carcass while the mold cavity is sealed against the entrance of moisture. If reasonable care has been used in distributing the materials and determining their volume with reference to the shape and capacity of the molding space, the heavy pressure finally exerted upon the tire will not produce any substantial drag or displacement of the carcass elements, the threads or cords of the tire remaining substantially in the exact position and relation in which they were placed during the building of the carcass upon the core.

This invention is adapted to produce tires having the highly-finished appearance incident to molding against smooth metal surfaces, but largely or wholly free from the wrinkles and fabric displacement heretofore incident to curing the complete tire on a rigid core in a rigid outer mold, this object being accomplished without the extra handlings and other objectionable accompaniments of prior two-stage curing or heating methods as commonly practiced.

The details of procedure may be variously modified without departing from my invention.

I claim:

1. The method of vulcanizing which comprises placing a vulcanizable rubber article in non-sealing contact with an enclosing outer mold, admitting steam to the molding space to heat the article and thereby partially condense the steam, reducing the pressure of the steam to evaporate the water of condensation from said space, and then vulcanizing the article in full contact with said mold.

2. The herein-described method which comprises subjecting a partly-closed mold having a vulcanizable rubber article therein to the direct action of saturated steam, removing water of condensation from within the mold, closing the mold, and vulcanizing the article in the closed mold.

3. A vulcanizing process comprising the steps of subjecting a vulcanizable rubber article in a partly-closed sectional mold to the direct action of saturated steam at super-atmospheric pressure, reducing the steam pressure to evaporate the water of condensation from within the mold, squeezing the mold sections together to close the mold, and vulcanizing the article in the closed mold.

4. A vulcanizing process comprising the steps of heating and partially vulcanizing a rubber article in an unsealed mold by the direct action of saturated steam thereon at a pressure above that of the atmosphere, evaporating the collected water of condensation from within the mold by reducing the steam pressure to that of the atmosphere, sealing the mold and completing the vulcanization of the article in the sealed mold.

5. A vulcanizing process comprising the steps of heating a rubber article by the direct action of saturated steam in a partly-closed sectional mold, maintaining a relatively-light mechanical pressure of the mold-parts thereon during said heating action, evaporating the water of condensation from within the mold by reducing the steam pressure, fully closing the mold and completing the vulcanization of the article in the fully-closed mold.

6. A vulcanizing process comprising the steps of heating a rubber article in an unsealed mold surrounded by saturated steam at super-atmospheric pressure in a heating chamber, reducing the steam-pressure to that of the atmosphere to dry the mold cavity, momentarily uncovering said chamber to dissipate the residual vapor, closing said chamber, closing the mold, and again admitting steam to said chamber at super-atmospheric pressure to vulcanize said article.

7. A vulcanizing process comprising the steps of locating a rubber article in a sectional mold, momentarily squeezing the mold sections together upon said article with heavy pressure while the article is comparatively cold and then relieving the heavy pressure, whereby increased contact at light pressure is obtained without full closure, heating the mold and article in this condition to soften the rubber, closing the mold with heavy pressure and heating the closed mold to vulcanize the article.

8. The method of making pneumatic tire casings which comprises building the casing complete with carcass and rubber tread, in substantially its ultimate U-shape, locating said casing in non-sealing contact with the halves of a rigid mold, heating the mold and casing by the direct action of steam to soften the tread rubber, removing water of condensation from the mold cavity, and vulcanizing the casing in full contact with the mold.

9. The method of making pneumatic tire casings which comprises building the casing complete with layers of rubberized carcass fabric and rubber tread and sides thereon, in substantially its ultimate U-shape, locating said casing with a contained rigid core between the parts of a rigid enclosing outer mold, subjecting the mold and casing to the direct action of saturated steam at super-atmospheric pressure without fully closing the mold, reducing the steam pressure to dry the interior of the mold, closing the mold, and vulcanizing the casing in the closed mold.

10. The method of making pneumatic tire casings which comprises building the casing complete in substantially its ultimate U-shape on a rigid annular core, with layers of rubberized carcass fabric and tread and side rubber, locating said casing and core between the halves of a rigid mold which is partly closed thereon, heating the parts in open steam at super-atmospheric pressure, reducing the steam pressure to dry the mold cavity, closing the mold, and further heating the parts in open steam to vulcanize the casing in the closed mold.

11. The method of making pneumatic tire casings which comprises building a casing of rubberized fibrous material, tread and side rubber, in substantially its ultimate U-shape, locating said casing on a rigid core between the halves of a rigid outer mold which is partly closed thereon, surrounding the parts with saturated steam maintained at super-atmospheric pressure for a sufficient length of time to soften the tread and side rubber and partly cure the carcass rubber, reducing the steam pressure to dry the mold cavity, closing the mold, and completing the vulcanization of the casing in the closed mold in open steam.

12. The method of making pneumatic tire casings which comprises building the casing complete and in substantially its ultimate U-shape on a rigid core, with layers of rubberized fabric, tread and side rubber, placing the casing and core between the halves of a rigid outer mold which is partly closed thereon, heating said mold, casing and core in saturated steam at super-atmospheric pressure to soften the tread and side rubber, reducing the steam pressure to that of the atmosphere, closing the mold, and heating it in steam at a pressure higher than the pressure of the first heating stage until the casing is completely vulcanized.

13. The method of making pneumatic tire casings which consists in building a U-shaped casing complete with a rubberized carcass and a rubber tread compounded to begin curing later and complete its cure in a shorter time than the carcass rubber, locating said casing on a rigid core between the halves of a rigid outer mold which is partly closed thereon, heating the parts in open steam to soften the tread and partly cure the carcass, reducing the steam pressure, closing the mold, and completing the cure of the casing in the closed mold surrounded by steam.

14. The method of making pneumatic tire casings which comprises building a U-shaped casing complete with carcass, tread and side rubber on a rigid core, locating said casing and core between the halves of a rigid outer mold, temporarily closing said mold with heavy pressure, relieving the pressure, surrounding the mold with saturated steam at super-atmospheric pressure to soften the tread and side rubber, reducing the steam pressure to dry the mold cavity, closing the mold with heavy pressure, and curing the tire in the closed mold surrounded by steam at super-atmospheric pressure.

15. The method of making pneumatic tire casings which comprises building the casings complete in U-shape with rubberized fabric carcasses and side and tread rubber thereon, locating the casings on rigid cores in two-part molds placed with their planes horizontal, stacking the molds vertically in an open-steam heater, surrounding the molds while they are partly open with saturated steam at super-atmospheric pressure to soften the tread and side rubber, lowering the steam pressure to dry the mold cavities, exerting endwise pressure on the stack to close the molds, and while so closed surrounding them with steam at super-atmospheric pressure to vulcanize the casings.

16. The method of making pneumatic tire casings which comprises simultaneously subjecting a complete raw casing having the surface rubber thereon to a relatively-light molding pressure within a partly-open, rigid mold and to the direct action of steam surrounding said mold, maintaining the heat for a sufficient length of time to mold the softened surface rubber by progressive closure of the mold, removing water of condensation from the molding cavity, subjecting the mold to a relatively-heavy closing pressure, and vulcanizing the casing in the closed mold.

17. The method of making pneumatic tire casings which comprises locating a complete raw casing on a rigid core between the halves of a rigid outer mold which is shaped to form anti-slipping projections in the tread rubber, simultaneously subjecting the casing to a relatively-light pressure of the mold halves and to the direct action of saturated steam at super-atmospheric pressure surrounding the mold, maintaining the heat until the carcass rubber is partially cured and the projections in the softened tread rubber are well defined, reducing the steam pressure to evaporate the water of condensation from within the mold, subjecting the mold to a relatively-heavy closing pressure, and completing the vulcanization of the casing in the closed mold.

In testimony whereof I have hereunto set my hand this 25th day of March, 1919.

HIRAM D. AYRES.